(12) United States Patent
Arakawa

(10) Patent No.: US 11,196,239 B2
(45) Date of Patent: Dec. 7, 2021

(54) ROUTE-REGULATING MEMBER FOR WIRE HARNESS AND WIRE HARNESS

(71) Applicant: SUMITOMO WIRING SYSTEMS, LTD., Yokkaichi (JP)

(72) Inventor: Hiroyuki Arakawa, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/980,133

(22) PCT Filed: Mar. 20, 2019

(86) PCT No.: PCT/JP2019/011705
§ 371 (c)(1),
(2) Date: Sep. 11, 2020

(87) PCT Pub. No.: WO2019/188662
PCT Pub. Date: Oct. 3, 2019

(65) Prior Publication Data
US 2021/0006053 A1    Jan. 7, 2021

(30) Foreign Application Priority Data

Mar. 27, 2018  (JP) .............................. JP2018-060325

(51) Int. Cl.
*H02G 3/04* (2006.01)
*B60R 16/02* (2006.01)

(52) U.S. Cl.
CPC ....... *H02G 3/0481* (2013.01); *B60R 16/0215* (2013.01)

(58) Field of Classification Search
CPC .......................... H02G 3/0481; B60R 16/0215
USPC ....................................................... 174/72 A
See application file for complete search history.

(56) References Cited

U.S. PATENT DOCUMENTS

| | | | | |
|---|---|---|---|---|
| 5,091,604 A * | 2/1992 | Kirma | ................. | H02G 3/0666 174/2 |
| 7,100,641 B2 * | 9/2006 | Tyrer | .................... | H02G 9/065 138/110 |
| 7,696,435 B1 * | 4/2010 | Thomas | ............... | H02G 3/0481 174/68.3 |
| 10,311,997 B2 * | 6/2019 | Tanigawa | ............ | B60R 16/0215 |
| 2013/0277106 A1 * | 10/2013 | Toyama | ............... | H01B 13/012 174/72 A |

FOREIGN PATENT DOCUMENTS

| | | |
|---|---|---|
| JP | 2011-138740 A | 7/2011 |
| JP | 2014-090579 A | 5/2014 |
| JP | 2016-046943 A | 4/2016 |
| WO | 2018/043542 A1 | 3/2018 |

OTHER PUBLICATIONS

May 4, 2019 Search Report issued in International Patent Application No. PCT/JP2019/011705.

* cited by examiner

*Primary Examiner* — Timothy J Thompson
*Assistant Examiner* — Michael F McAllister
(74) *Attorney, Agent, or Firm* — Oliff PLC

(57) ABSTRACT

A route-regulating member according to an exemplary aspect is configured to be applied to a wire harness that includes a wire, and configured to regulate a route of the wire inserted therein, the route-regulating member including: a tube; and a tube connector having a curve, to which an end of the tube is connected.

9 Claims, 4 Drawing Sheets

ROUTE-REGULATING MEMBER FOR WIRE HARNESS AND WIRE HARNESS

BACKGROUND

The present disclosure relates to a route-regulating member for a wire harness, and a wire harness.

For example, a currently-used wire harness for a vehicle is provided with a protector for routing a wire along a predetermined wiring path (see, for example, JP 2016-46943A). The protector disclosed in JP 2016-46943A includes a protector body with a recess where the wire can be housed, and a lid member configured to close an opening of the recess. The protector body and the lid member are each made of a synthetic resin material. A protector whose shape corresponds to the shape of the predetermined wiring path is used to regulate the path of the wire housed in the protector.

SUMMARY

Here, the shape of the protector of the wire harness disclosed in JP 2016-46943A corresponds to the shape of the predetermined wiring path. As a result, protectors different in shape need to be used for different wiring paths.

An exemplary aspect of the disclosure provides a route-regulating member for a wire harness and a wire harness that enable regulation of a wiring route with a simple configuration.

A route-regulating member according to an exemplary aspect is configured to be applied to a wire harness that includes a wire, and configured to regulate a route of the wire inserted therein, the route-regulating member including; a tube; and a tube connector having a curve, to which an end of the tube is connected.

With this configuration, the route-regulating member enables separation of the tube from the tube connector having the curve. Accordingly, replacement with another tube connector having a different bending angle allows application to different types of wiring routes. Moreover, the overall length of the tube connector can be shortened, leading to easy formation of the tube connector. This achieves regulation of the wiring route with a simple configuration.

It is preferable that, in the above-described route-regulating member for the wire harness, the tube connector and the tube are both conductive and are connected to each other electrically.

With this configuration, the tube connector and the tube enable absorption of electromagnetic waves generated by energization of the wire. Moreover, absorbed electric charge flows from the tube connector to the tube, or vice versa, connected to each other electrically. This achieves release of the electric charge to ground.

It is preferable that, in the above-described route-regulating member for the wire harness, the tube connector includes a flexible and insulative tubular body, and an electric conductor provided inside the body, the electric conductor and the tube being connected to each other electrically.

With this configuration, the electric conductor is provided inside the body made of an insulative material such as a rubber material or a resin, thus making it possible to form the conductive tube connector.

In addition, since the body is flexible, the wire harness can be easily routed by bending the body.

It is preferable that, in the above-described route-regulating member for the wire harness, the electric conductor includes an embedded portion embedded in the body, and a protrusion connected to the embedded portion and protruding from an inner peripheral surface of the body, the protrusion abutting against the tube.

With this configuration, the protrusion of the electric conductor abuts against the tube, leading to favorable electrical connection between the electric conductor and the tube. Moreover, the electric conductor is not entirely exposed inside the body of the tube connector, and the body of the tube connector is interposed between the embedded portion of the electric conductor and the tube. This achieves suppression of damage to the electric conductor caused by contact with an edge of the tube when the tube is inserted into an end of the tube connector, for example.

It is preferable that, in the above-described route-regulating member for the wire harness, the electric conductor is a braided member with conductive strands braided in a tubular shape.

With this configuration, a shielding member (electric conductor) is formed by the braided member so as to be flexible. Accordingly, the shielding member bends along with bending deformation of the body. This enables much easier routing of the wire harness.

Also with this configuration, the tubular shielding member made of the braided member is inserted to form the body, leading to easy formation of the tube connector.

It is preferable that, in the above-described route-regulating member for the wire harness, the tube includes a first member and a second member both of which are attached to each other to form the tube, and at least either the first member or the second member includes a restriction provided on at least either an end face thereof in a circumferential direction or an outer peripheral surface of an end portion thereof in the circumferential direction, the restriction being configured to restrict relative displacement between the first member and the second member in a radial direction.

With this configuration, the first member and the second member can cover the wire easily by sandwiching the wire therebetween.

Also with this configuration, the restriction provided on the first member or the second member enables restriction of relative displacement between the first member and the second member in the radial direction. Accordingly, the wire is kept covered suitably by the first member and the second member while the first member and the second member form the tube.

In particular, since the restriction is provided on the end faces in the circumferential direction or the outer peripheral surface of the end portions in the circumferential direction of the first member and the second member, the regulating portion does not need to be provided on the inner peripheral side of the first member and the second member. Accordingly, it is possible to suppress the case where the space inside of the tube is limited by the restriction, leading to reduction in upsizing of the first member and the second member (tube) for covering the wire. This makes it possible to suppress an increase in the size of the first member and the second member as well as of the wire harness.

It is preferable that, in the above-described route-regulating member for the wire harness, the restriction is a restricting projection configured to protrude circumferentially outward from the outer peripheral surface of the end of at least either the first member or the second member, and a fitting recess into which the restricting projection fits is provided on an inner peripheral surface of an end of the tube connector.

With this configuration, when the ends of the first member and the second member are inserted into and connected to the end of the tube connector, the restricting projection fits into the fitting recess of the tube connector, thus making it possible to position the first member and the second member with respect to the tube connector.

It is preferable that, in the above-described route-regulating member for the wire harness, the first member and the second member may be a pair of halves, for example.

A wire harness configured to achieve the above aspects includes a wire and the route-regulating member for the wire harness described above.

With this configuration, the same functions and effects as those of the route-regulating member for the wire harness can be achieved.

The present disclosure enables regulation of the wiring route with a simple configuration.

DETAILED DESCRIPTION OF EMBODIMENTS

The following describes one embodiment of the present disclosure with reference to FIGS. 1 to 5.

Figure 1:
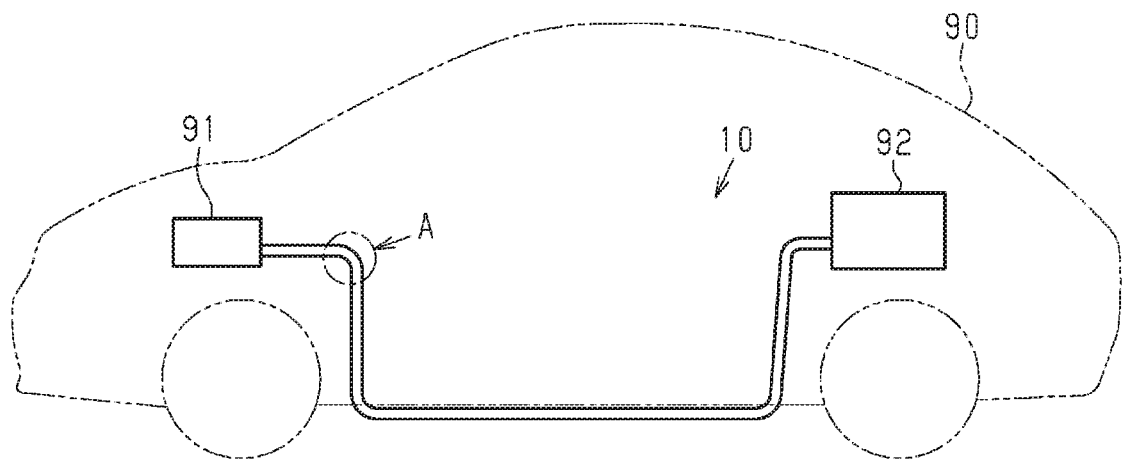
FIG. 1 is a side view according to one embodiment of a route-regulating member for a wire harness and a wire harness in which the wire harness is routed in a vehicle.

As shown in FIG. 1, a wire harness 10 is routed in a route of a vehicle 90 such as a hybrid vehicle or an electric vehicle, the route including the underfloor of the vehicle. The wire harness 10 electrically connects a motor 91 disposed in a front part of the vehicle 90 and an inverter 92 disposed in a rear part of the vehicle 90.

Figure 2:
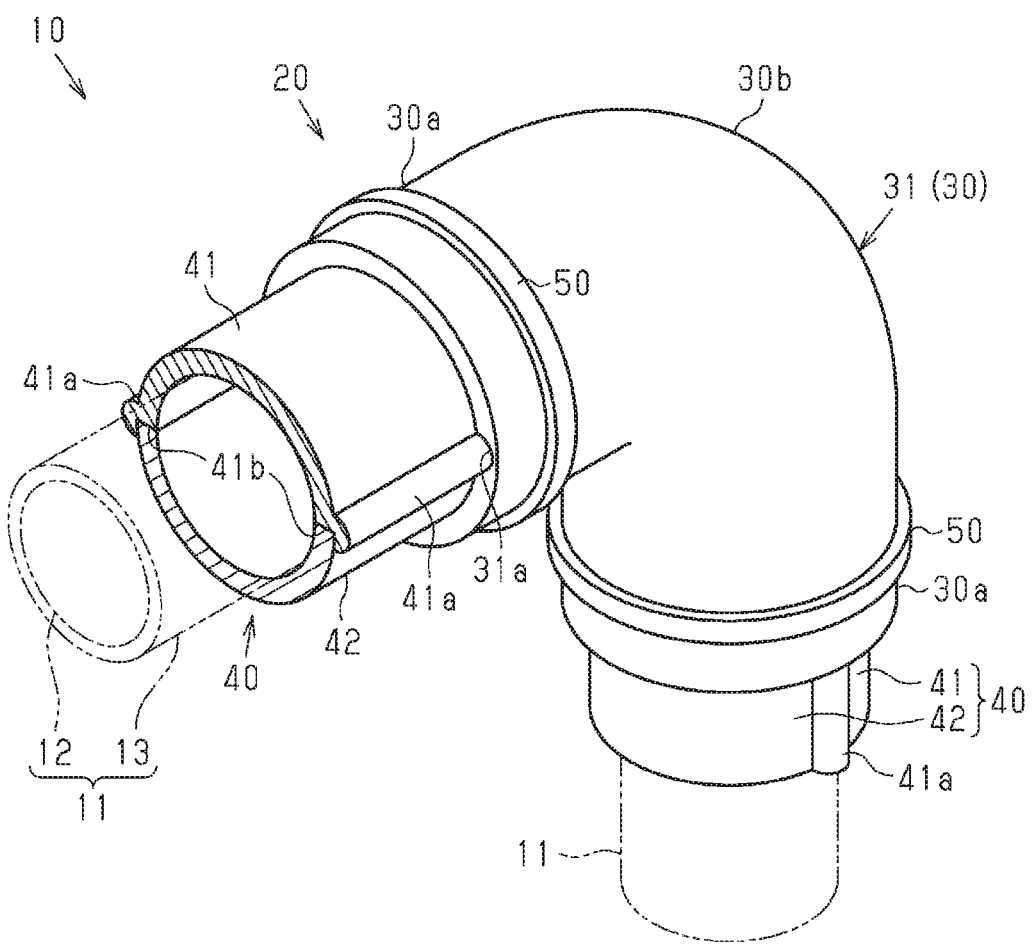
FIG. 2 is an enlarged perspective view of a portion A in FIG. 1.

As shown in FIG. 2, the wire harness 10 includes a wire 11, and a tubular route-regulating member 20 that receives insertion of the wire 11 and is configured to regulate a route of the wire 11.

The wire 11 includes a core wire 12 and an insulating covering 13 that covers an outer periphery of the core wire 12. The core wire 12 is, for example, a stranded wire obtained by twisting together a plurality of stranded metal wires made of a copper alloy. The insulating covering 13 is formed by an insulator such as polyvinyl chloride (PVC).

The route-regulating member 20 includes a plurality of tubular members 40 (tubes) spaced apart from each other in a longitudinal direction of the wire 11, a tubular connecting member 30 (tube connector) which is disposed between two tubular members 40 adjacent to each other in the longitudinal direction and to which end portions of the tubular members 40 are connected, and clamping members 50 configured to clamp the connecting member 30 on the tubular members 40.

Next, the tubular member 40 and the connecting member 30 will be described in detail.

Tubular Member 40

Figure 3:
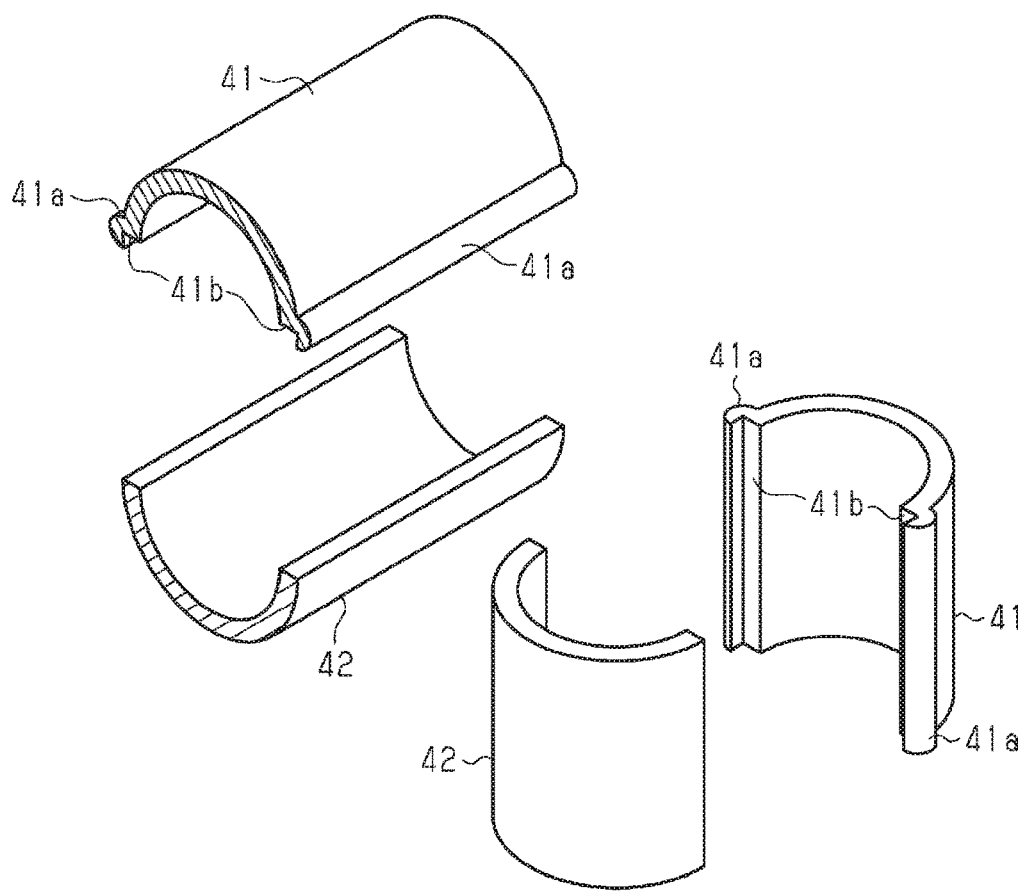
FIG. 3 is a perspective view in which a first half and a second half forming a tubular member in FIG. 2 are spaced apart from each other.

As shown in FIGS. 2 and 3, the tubular member 40 has an axis extending in a straight line, and includes a pair of halves (first half 41 and second half 42) each in a half-cylindrical shape. The halves 41, 42 are each made of an aluminum alloy. Hereinafter, a circumferential direction around the axis of the tubular member 40 is simply referred to as a circumferential direction.

The first half 41 includes a pair of restricting projections 41a. The restricting projections 41a protrude from opposite end portions of the first half 41 in the circumferential direction outward with respect to an outer peripheral surface of the first half 41 beyond both end faces 41b in the circumferential direction. The restricting projections 41a of this embodiment each have a semicircular cross-section, and are provided over the entire length of the first half 41.

As shown in FIG. 2, the restricting projections 41a face the outer peripheral surface of the end portions of the second half 42 in the circumferential direction while the two end faces 41b of the first half 41 are attached to the two end faces of the second half 42. This enables restriction of relative displacement between the halves 41, 42 in a radial direction.

Here in this embodiment, the paired halves form the tubular member 40. Alternatively, a first member and a second member whose circumferential length is longer than the first member may be attached to each other to form a tubular member 40, for example. In other words, it is only necessary to form the tubular member 40 by a plurality of members. Alternatively, a tubular member 40 may be formed by arranging a third member between the first member and the second member.

Connecting Member 30

Figure 4:
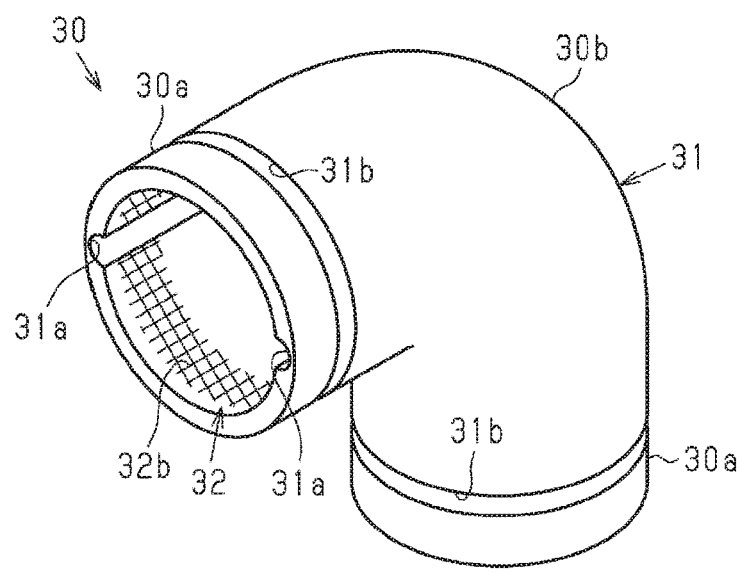
FIG. 4 is a perspective view of a connecting member according to the embodiment.
Figure 5:
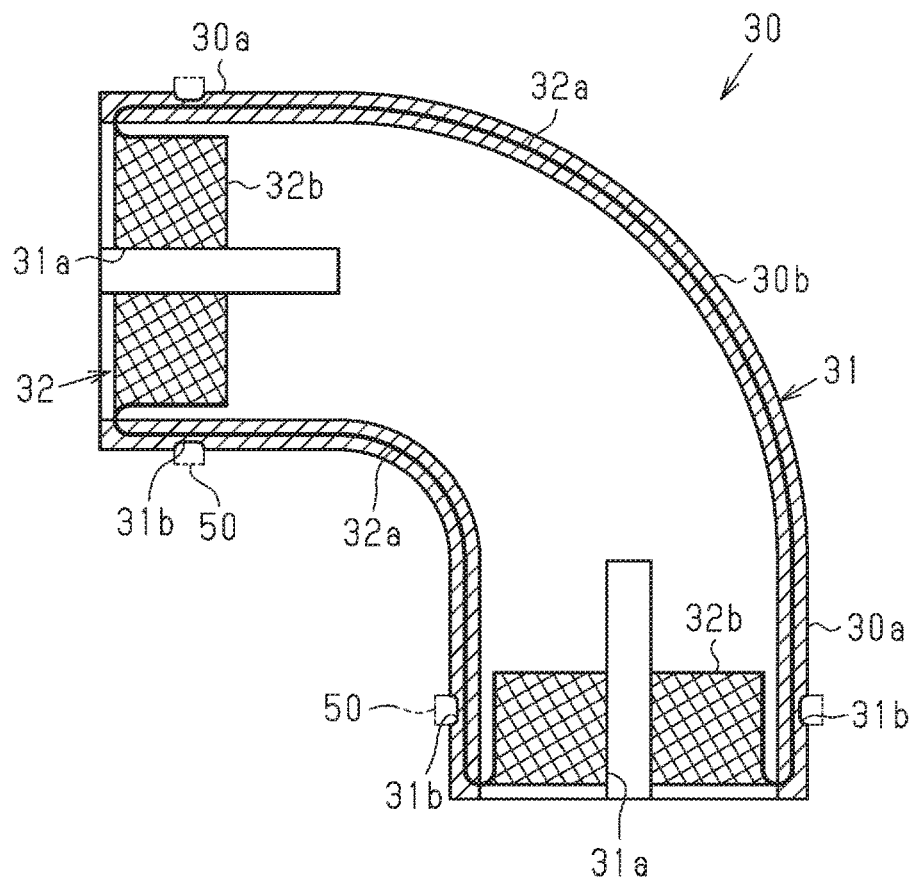
FIG. 5 is a sectional view of a longitudinal cross-sectional structure of the connecting member according to the embodiment.

As shown in FIGS. 2, 4, and 5, the connecting member 30 includes a pair of straight portions 30a into which the end portions of the tubular members 40 are inserted respectively, and a curved portion 30b (curve) between the straight portions 30a.

As shown in FIGS. 4 and 5, the connecting member 30 includes a tubular body 31 forming an envelope of the connecting member 30, and a shielding member 32 formed by an electric conductor provided inside the body 31.

The body 31 is made of a rubber material, and has flexibility and insulating properties.

A pair of fitting recesses 31a each extending in the longitudinal direction of the straight portion 30a are provided on the inner peripheral surface of each of the two end portions of the body 31. The fitting recess 31a according to this embodiment has a semicircle sectional shape, which conforms to the shape of the restricting projection 41a.

Annular grooves 31b each extending in the circumferential direction of the straight portions 30a are formed on the outer peripheral surface of the two end portions of the body 31.

As shown in FIG. 2, the two restricting projections 41a of the tubular member 40 (first half 41) fit into the fitting recesses 31a, respectively. Moreover, clamping members 50 such as a metallic caulking ring are attached to the annular grooves 31b (see FIGS. 4 and 5), respectively.

As shown in FIGS. 4 and 5, the shielding member 32 is formed by a braided member with conductive strands braided in a tubular shape. The strands forming the shielding member 32 are made of the same aluminum alloy as that of the tubular member 40.

The shielding member 32 includes an embedded portion 32a embedded around the entire circumference of the body 31, and a pair of protruding portions 32b (protrusions) connected to opposite sides of the embedded portion 32a in the longitudinal direction and protruding from the inner peripheral surface of the body 31.

The protruding portions 32b are each folded inward with respect to the direction in which the body 31 extends. It should be noted that a part of the protruding portion 32b corresponding to the fitting recess 31a is cut out. The annular groove 31b is provided on the outer circumferential side of the protruding portion 32b.

The clamping members 50 attached to the annular grooves 31b clamp the connecting member 30 on the tubular members 40 after the tubular members 40 (first half 41, second half 42) are inserted into the two end portions of the body 31. Accordingly, the outer peripheral surfaces of the tubular members 40 abut against the inner peripheral surfaces of the protruding portions 32b of the shielding member 32, achieving electric connection between the shielding member 32 and the tubular members 40.

Here, the other ends of the tubular members 40 (the end portions not inserted into the connecting member 30) are fixed with adhesive tape (not shown).

Next, functions and effects of this embodiment will be described.

(1) The route-regulating member 20 includes the tubular members 40, and the tubular connecting member 30 having the curved portion 30b, to which the end portions of the tubular members 40 are connected.

With this configuration, the route-regulating member 20 enables separation of the tubular members 40 from the connecting member 30 having the curved portion 30b. Accordingly, replacement with another connecting member 30 having a different bending angle allows application to different types of wiring routes. Moreover, the overall length of the connecting member 30 can be shortened, leading to easy formation of the connecting member 30. This achieves regulation of the wiring route with a simple configuration.

(2) The connecting member 30 includes the tubular body 31 with flexibility and insulating properties, and the shielding member 32 formed by the electric conductor provided inside the body 31. The tubular members 40 are made of a conductive metallic material. The shielding member 32 and the tubular members 40 are connected to each other electrically.

With this configuration, the connecting member 30 and the tubular members 40 enable absorption of electromagnetic waves generated by energization of the wire 11. Moreover, absorbed electric charge flows from the connecting member 30 to the tubular members 40, or vice versa, connected to each other electrically. This achieves release of the electric charge to ground.

With this configuration, provision of the shielding member 32 formed by the electric conductor inside the body 31 made of insulative rubber enables formation of the connecting member 30 with conductivity.

In addition, since the body 31 is flexible, bending the body 31 enables easy routing of the wire harness 10.

(3) The shielding member 32 is formed by the braided member with the conductive strands braided in a tubular shape. The shielding member 32 includes the embedded portion 32a embedded in the body 31, and the protruding portions 32b connected to the embedded portion 32a and protruding from the inner peripheral surface of the body 31. The protruding portions 32b abut against the tubular members 40.

With this configuration, the protruding portions 32b of the shielding member 32 abut against the tubular members 40, respectively, leading to favorable electrical connection between the shielding member 32 and the tubular members 40. Moreover, the shielding member 32 is not entirely exposed inside the body 31 of the connecting member 30, and the body 31 of the connecting member 30 is interposed between the embedded portion 32a of the shielding member 32 and the tubular members 40. This achieves suppression of damage to the shielding member 32 caused by contact with the edges of the tubular members 40 when the tubular members 40 are inserted into the end portions of the connecting member 30, for example.

Moreover, the shielding member 32 is formed by the braided member so as to be flexible. Accordingly, the shielding member 32 bends along with the bending deformation of the body 31. This enables easier routing of the wire harness 10.

Also, with this configuration, the tubular shielding member 32 made of the braided member is inserted to form the body 31, leading to easy formation of the connecting member 30.

(4) The tubular member 40 includes the paired halves 41, 42 each in a half-cylindrical shape. The first half 41 includes the restricting projections 41a on the outer peripheral surface of the end portions in the circumferential direction of the first half 41. The restricting projections 41a restrict relative displacement between the halves 41, 42 in the radial direction.

With this configuration, the paired halves 41, 42 can cover the wire 11 easily by sandwiching the wire 11 therebetween.

Also with the above-described configuration, the restricting projections 41a provided on the first half 41 restrict relative displacement between the halves 41, 42 in the radial direction. Accordingly, the wire is kept covered suitably by the first half 41 and the second half 42 while the paired halves 41, 42 form the tubular member 40.

In particular, since the restricting projections 41a protrude circumferentially outward from the opposite end portions of the first half 41 in the circumferential direction, the restricting portions (restrictions) do not need to be provided on the inner peripheral side of the first half. Accordingly, it is possible to suppress the case where the space inside of the tubular member 40 is limited by the restricting projections 41a, leading to reduction in upsizing of the halves 41, 42 (tubular member 40) for covering the wire 11. This makes it possible to suppress an increase in the size of the halves 41, 42 as well as of the wire harness 10.

(5) The fitting recesses 31a into which the restricting projections 41a fit are provided on the inner peripheral surface of the end portions of the connecting member 30.

With this configuration, when the end portions of the tubular members 40 formed by the paired halves 41, 42 are inserted into and connected to the end portions of the connecting member 30, the restricting projections 41a fit into the fitting recesses 31a of the connecting member 30, thus making it possible to position the halves 41, 42 with respect to the connecting member 30.

(6) The strands forming the shielding member 32 are made of the same aluminum alloy as that of the tubular member 40. This suppresses electrolytic corrosion between the shielding member 32 and the tubular member 40.

(7) The clamping members 50 clamping the connecting member 30 to the tubular members 40 are attached to the annular grooves 31b provided on the outer peripheral surface of the connecting member 30.

Such a configuration achieves suppression in relative displacement between the connecting member 30 and the tubular members 40. Moreover, the annular grooves 31b are provided on the outer circumferential side of the protruding portions 32b of the shielding member 32, leading to close adhesion of the protruding portions 32b to the tubular member 40. This enhances reliability of electric connection between the connecting member 30 and the tubular members 40. Furthermore, the annular grooves 31b enable positioning of the clamping members 50.

(8) The wire harness 10 includes the wire 11 with the insulated and covered core wire 12, and the tubular route-regulating member 20.

With this configuration, the same functions and effects as those described in the above sections (1) to (7) can be achieved.

The present embodiments can be modified as follows. The present embodiment and following modifications may be combined to the extent not contradictory to each other in technique.

Figure 6:
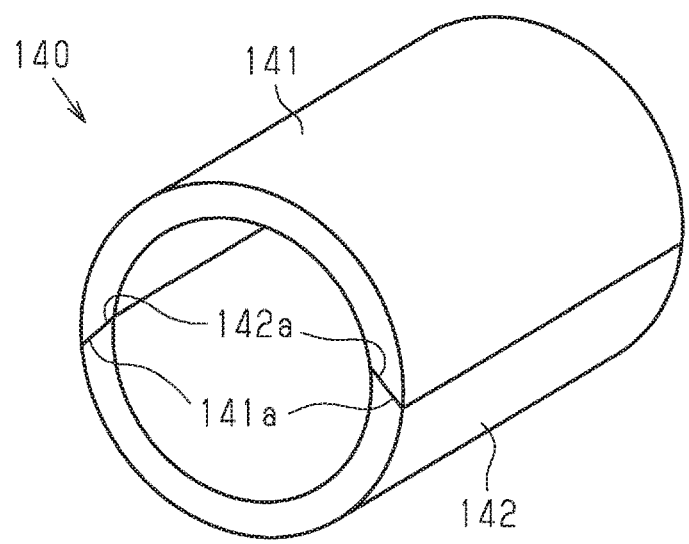
FIG. 6 is a perspective view of a tubular member according to one modification.
Figure 7A:
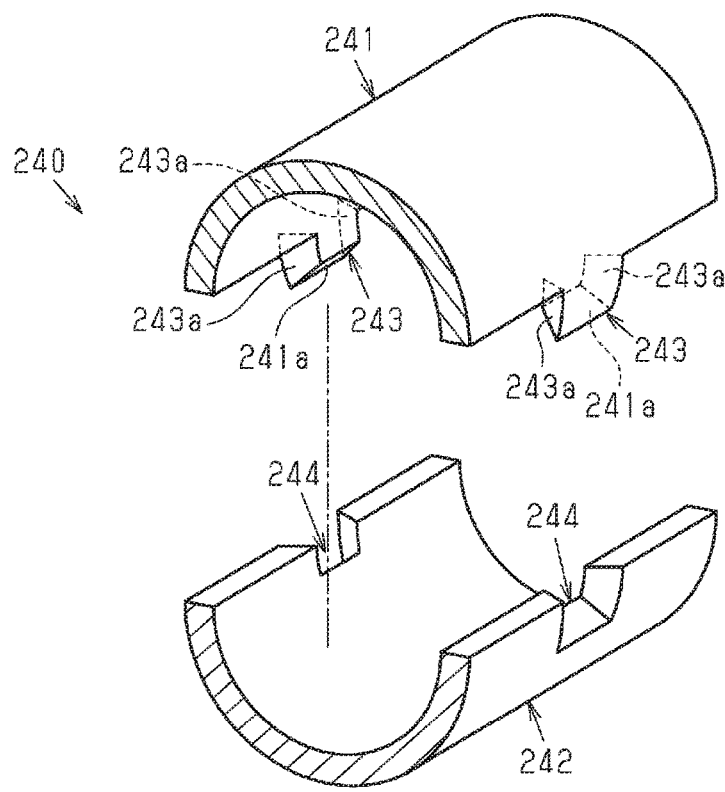
FIG. 7(a) is a perspective view in which a pair of halves forming the tubular member are spaced apart from each other.
Figure 7B:
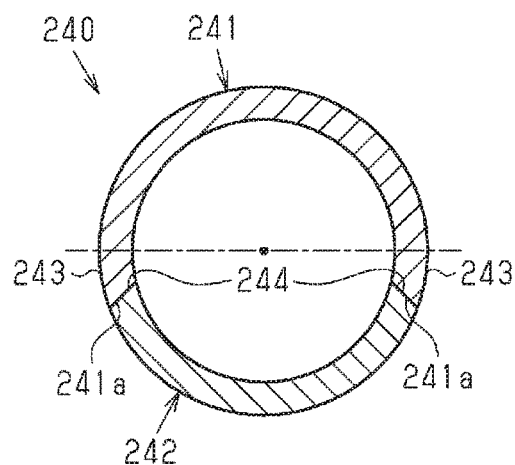
FIG. 7(b) is a sectional view of a cross-sectional structure of the tubular member orthogonal to an axis of the tubular member.
Figure 7C:
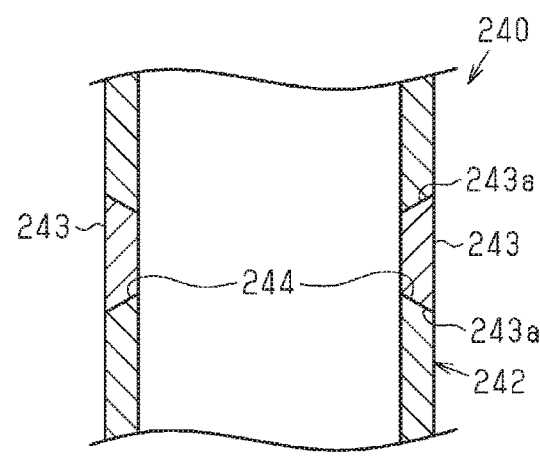
FIG. 7(c) is a sectional view of a cross-sectional structure of the tubular member along the axis of the tubular member.

- The clamping member 50 may be changed to a cable tie made of a synthetic resin.
- In the above-described embodiment, a part of the protruding portion 32b of the shielding member 32 corresponding to the fitting recess 31a of the body 31 is cut away. However, such a cut-away part is not essential, and thus is omittable.
- The wire harness 10 may include a plurality of connecting members 30. In this case, it is only necessary that the end portions of the tubular members 40 are connected to the connecting members 30.
- Moreover, an annular sealing lip may protrude from the inner peripheral surface of the end portion of the body 31 of the connecting member 30. In this case, the sealing lip closely comes into contact with the outer peripheral surfaces of the tubular members 40, leading to enhanced sealing properties between the tubular members 40 and the connecting member 30.
- The restricting projections 41a are not limited to being provided over the entire length of the first half 41. In other words, multiple restricting projections may be provided at intervals along the length of the first half 41.
- As shown in FIG. 6, a first half 141 and a second half 142 may include restricting faces 141a and 142a, respectively, on the opposite end faces thereof in the circumferential direction for restricting relative displacement between the halves 141 and 142 in a radial direction. In this case, both the restricting faces 141a of the first half 141 are inclined away from each other with respect to the radial direction of the tubular member 140. Moreover, both the restricting faces 142a of the second half 142 are inclined along the restricting faces 141a of the opposite first half 141 away from each other with respect to the radial direction of the tubular member 140. This can achieve the same functions and effects as those described in section (4) of the above-described embodiment. Also in this case, the restricting projections 41a are omittable, leading to easy formation of the halves 141, 142. Also in this case, the fitting recesses 31a of the body 31 are omittable.
- As shown in FIGS. 7(a) to 7(c), engaging projections 243 may protrude along the circumferential direction from opposite end faces of a first half 241 in the circumferential direction, and engaging recesses 244 that engage with the engaging projections 243 may be provided on opposite end faces of a second half 242 in the circumferential direction, the engaging recesses 244 conforming in shape to the pair of engaging projections 243. First restricting faces 241a are provided on end faces in the circumferential direction of the engaging projections 243, the first restricting faces 241a being inclined away from each other with respect to the radial direction of a tubular member 240. Moreover, second restricting faces 243a are provided on side faces of the engaging projections 243, i.e., on end faces of the tubular member 240 in the longitudinal direction, the second restricting faces 243a being inclined so as to approach each other while extending circumferentially inward. In this case, relative displacement in the radial direction and the longitudinal direction can be restricted between the halves 241 and 242. Here, either the above first restricting face 241a or the second restricting face 243a is omittable. Even in this case, relative displacement in the radial direction can be restricted between the halves 241 and 242.
- The half 41 may include no regulating portion for restricting relative displacement between the halves 41 and 42 in the radial direction.
- In the above-described embodiment, the tubular member 40 is divided into the paired halves 41, 42. Alternatively, the tubular member 40 may be formed by one cylindrical component.
- The electric conductor forming the shielding member 32 of the connecting member 30 is not limited to the braided member. The electric conductor may be formed by metallic foil made of an aluminum alloy, for example.
- It is preferable that the tubular members 40 and the electric conductor of the shielding member 32 are made of the same metallic material, and the metallic material may be a material other than the aluminum alloy. Moreover, the tubular members 40 and the electric conductor of the shielding member 32 are not limited to being made of the same metallic material, and they may be made of metallic materials different from each other.
- The body 31 of the connecting member 30 is not limited to being made of a rubber material. The connecting member 30 may be molded entirely by a metallic material such as an aluminum alloy.
- For example, the connecting member may be formed by only the body 31 made of a rubber material. Alternatively, the tubular member may be made of a rigid resin material. In this case, it is preferable that a wire is covered with a shielding member formed by a conductive braided member, for example.

It will be apparent to those skilled in the art that the present disclosure may be embodied in other specific forms without departing from the technical concept of the disclosure. For example, some of the components described in the embodiments (or one or more aspects thereof) may be omitted, or some of the components may be combined. The scope of the present disclosure should be determined with reference to the appended claims, along with the full scope of equivalents to which such claims are entitled.

The invention claimed is:

1. A route-regulating member configured to be applied to a wire harness that includes a wire, and configured to regulate a route of the wire inserted therein, the route-regulating member comprising:
   a tube; and a tube connector having (i) a curve portion, to which an end of the tube is connected, and (ii) a plurality of fitting recesses on an inner peripheral surface of an end of the tube connector for receiving a plurality of projections on the tube.

2. The route-regulating member according to claim 1, wherein the tube connector and the tube are both conductive and are connected to each other electrically.

3. A route-regulating member configured to be applied to a wire harness that includes a wire, and configured to regulate a route of the wire inserted therein, the route-regulating member comprising:
   a tube; and
   a tube connector having a curve portion, to which an end of the tube is connected, wherein
   the tube connector includes a flexible and insulative tubular body, and an electric conductor provided inside the body, and
   the electric conductor and the tube are connected to each other electrically.

4. The route-regulating member according to claim 3, wherein
   the electric conductor includes an embedded portion embedded in the body, and a protrusion connected to the embedded portion and protruding from an inner peripheral surface of the body, and
   the protrusion abuts against the tube.

5. The route-regulating member according to claim 3, wherein the electric conductor is a braided member with conductive strands braided in a tubular shape.

6. A route-regulating member configured to be applied to a wire harness that includes a wire, and configured to regulate a route of the wire inserted therein, the route-regulating member comprising:
   a tube; and
   a tube connector having a curve portion, to which an end of the tube is connected, wherein
   the tube includes a first member and a second member both of which are attached to each other to form the tube, and
   at least either the first member or the second member includes a restriction provided on at least either an end face thereof in a circumferential direction or an outer peripheral surface of an end thereof in the circumferential direction, the restriction being configured to restrict relative displacement between the first member and the second member in a radial direction.

7. The route-regulating member according to claim 6, wherein
   the restriction is a restricting projection configured to protrude circumferentially outward from the outer peripheral surface of the end of at least either the first member or the second member, and
   a fitting recess into which the restricting projection fits is provided on an inner peripheral surface of an end of the tube connector.

8. The route-regulating member according to claim 6, wherein the first member and the second member are a pair of halves.

9. A wire harness, comprising:
   the wire with an insulated and covered core wire; and
   the route-regulating member according to claim 1.

* * * * *